(12) United States Patent
Bowen

(10) Patent No.: US 6,401,850 B1
(45) Date of Patent: Jun. 11, 2002

(54) ELECTRIC DRIVE AXLE FOR HYBRID VEHICLE

(75) Inventor: Thomas C. Bowen, Rochester Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/808,575

(22) Filed: Mar. 14, 2001

(51) Int. Cl.[7] .............................. B60K 1/00; B60K 6/00
(52) U.S. Cl. ................. 180/65.6; 180/65.2; 180/69.6
(58) Field of Search .................... 180/65.6, 165, 180/65.2, 69.6, 65.4, 65.7; 475/2, 3, 5, 149, 150, 151, 206, 174; 477/2; 60/718; 701/22; 74/661, 335; 318/376

(56) References Cited

U.S. PATENT DOCUMENTS

| | | | | |
|---|---|---|---|---|
| 5,443,130 A | * | 8/1995 | Tanaka et al. ............. | 180/65.6 |
| 5,513,919 A | * | 5/1996 | Moroto et al. ............. | 180/65.6 |
| 5,577,973 A | * | 11/1996 | Schmidt ...................... | 475/5 |
| 5,620,387 A | * | 4/1997 | Janiszewski ............... | 180/65.7 |
| 5,713,425 A | * | 2/1998 | Buschhaus et al. ........ | 180/65.2 |
| 5,919,109 A | * | 7/1999 | Fleckenstein | |
| 5,943,918 A | * | 8/1999 | Reed, Jr. et al. ............. | 74/661 |
| 6,019,698 A | * | 2/2000 | Lawrie et al. | |
| 6,041,877 A | * | 3/2000 | Yamada et al. ............ | 180/65.2 |
| 6,059,684 A | * | 5/2000 | Sasaki et al. | |
| 6,083,138 A | * | 7/2000 | Aoyama et al. ........... | 180/65.7 |
| 6,170,587 B1 | * | 1/2001 | Bullock ..................... | 180/69.6 |

\* cited by examiner

Primary Examiner—Douglas C. Butler
(74) Attorney, Agent, or Firm—Harness, Dickey & Pierce P.L.C.

(57) ABSTRACT

An electric drive axle for use in hybrid vehicles has an electric motor driving a compact gearbox. The gearbox includes a planetary reduction unit and a differential assembly. The planetary reduction unit has compound planet gears supported from a planet carrier which mesh with a fixed ring gear and a sun gear driven by the electric motor. The planet carrier drives the differential which transfer motive power to a pair of output shafts adapted for connection to one set of wheels. When used with a conventional engine-based powertrain for the other set of wheels, the electric drive axle establishes a four-wheel drive powertrain for the hybrid vehicle. The electric motor and gearbox are mounted in a common housing assembly to provide a compact drive axle assembly.

26 Claims, 8 Drawing Sheets

ELECTRIC DRIVE AXLE FOR HYBRID VEHICLE

FIELD OF THE INVENTION

The present invention relates to hybrid drive systems for motor vehicles. More specifically, the present invention relates to an integrated electric motor and axle assembly for use in hybrid motor vehicles.

BACKGROUND OF THE INVENTION

Automobile manufacturers are actively working to develop alternative powertrain systems in an effort to reduce the level of pollutants exhausted into the air by conventional powertrains equipped with internal combustion engines. Significant development has been directed to electric vehicles and fuel cell vehicles. Unfortunately, these alternative powertrain systems suffer from several disadvantages and, for all practical purposes, are still under development. However, several different hybrid electric vehicles (HEV) have recently been offered for sale. These hybrid vehicles are equipped with an internal combustion engine and an electric motor that can be operated independently or in combination to drive the vehicle.

There are two types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

Hybrid powertrains have also been adapted for use in four-wheel drive vehicles and typically utilize the above-noted parallel hybrid powertrain to drive the primary wheels and a second electric motor to drive the secondary wheels. Obviously, such a four-wheel drive system is extremely expensive and difficult to package. Thus, a need exists to develop hybrid powertrains for use in four-wheel drive vehicles that utilize many conventional powertain components so as to minimize specialized packaging and reduce cost.

SUMMARY OF THE INVENTION

It is an object of the present invention to provide a hybrid powertrain of drive system for a four-wheel drive vehicle.

It is another object of the present invention to provide an integrated gearbox and electric motor assembly for use as an electric drive motor axle in a hybrid vehicle.

As a related object, the hybrid drive system of the present invention utilizes an internal combustion engine as a first drive source to supply motive power to a first set of wheels and further uses the electric drive motor axle as a second drive source to supply motive power to a second set of wheels. A control system functions to control operation of the first and second drive sources either independently or in combination was dictated by the current vehicle operating conditions.

These and other objects are provided by an electric motor drive axle having an electric motor and a gearbox packaged within a common housing assembly. The gearbox includes a differential assembly interconnecting a pair of axleshafts, and a planetary reduction unit having an input member driven by the electric motor and an output member driving the differential assembly. The planetary reduction unit includes a sun gear driven by the motor, a ring gear fixed to the housing assembly, a planet carrier fixed to an input member of differential assembly, and a compound planet gear having a first gear segment meshed with the sun gear and a second gear segment meshed with the ring gear.

Further areas of applicability of the present invention will become apparent from the detailed description provided hereinafter. However, it should be understood that the detailed description and specific examples, while indicating preferred embodiments of the present invention, are intended for purposes of illustration only since various changes and modifications within the fair scope of this particular invention will become apparent to those skilled in the art.

DETAILED DESCRIPTION OF THE PREFERRED EMBODIMENTS

The present invention is related to an integrated gearbox and electric motor assembly, hereinafter referred to as electric drive motor axle, which functions as an electrically-controlled transaxle in a hybrid motor vehicle for delivering motive power (i.e., drive torque) to a pair of ground-engaging wheels. The compact arrangement of the electric motor and gearbox in a common housing permits the use of the electric drive motor axle in substitution for a conventional axle assembly. As such, conventional rear-wheel drive and front-wheel drive powertrains can be used in combination with the electric drive motor axle so as to establish a hybrid drive system for a four-wheel drive vehicle. Accordingly, various features and functional characteristics of the electric drive motor axle will be set forth below in a manner permitting those skilled in relevant arts to fully comprehend and appreciate the significant advantages the present invention provides, particularly when used in four-wheel drive hybrid vehicles.

Figure 1:
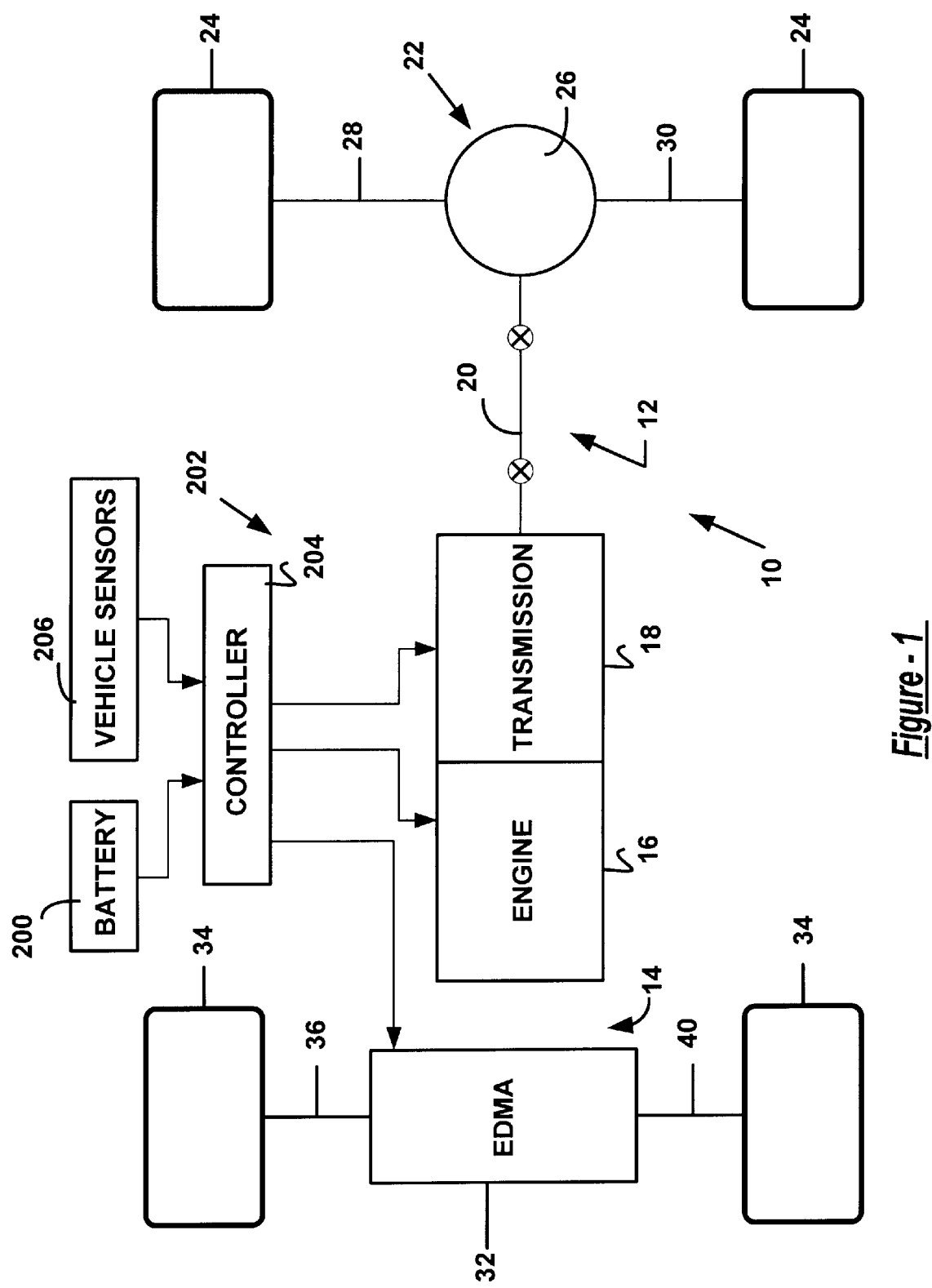
FIG. 1 is a schematic view showing a hybrid powertrain for a four-wheel drive vehicle in accordance with the present invention.

Referring to FIG. 1, a four-wheel drive powertrain for a hybrid electric vehicle 10 is shown to include a first powered driveline 12 and a second powered driveline 14. First powered driveline 12 includes an internal combustion engine 16, a transmission 18, a drive shaft 20, and an axle assembly 22 connecting a pair of wheels 24. Engine power is delivered to a differential unit 26 associated with axle assembly 22 through transmission 18 and drive shaft 20. The drive torque delivered to differential unit 26 is transferred through axleshafts 28 and 30 to wheels 24. Second powered driveline 14 includes an electric drive motor axle (EDMA) 32 which drives a second pair of wheels 34 through axleshafts 36 and 40.

Figure 2:
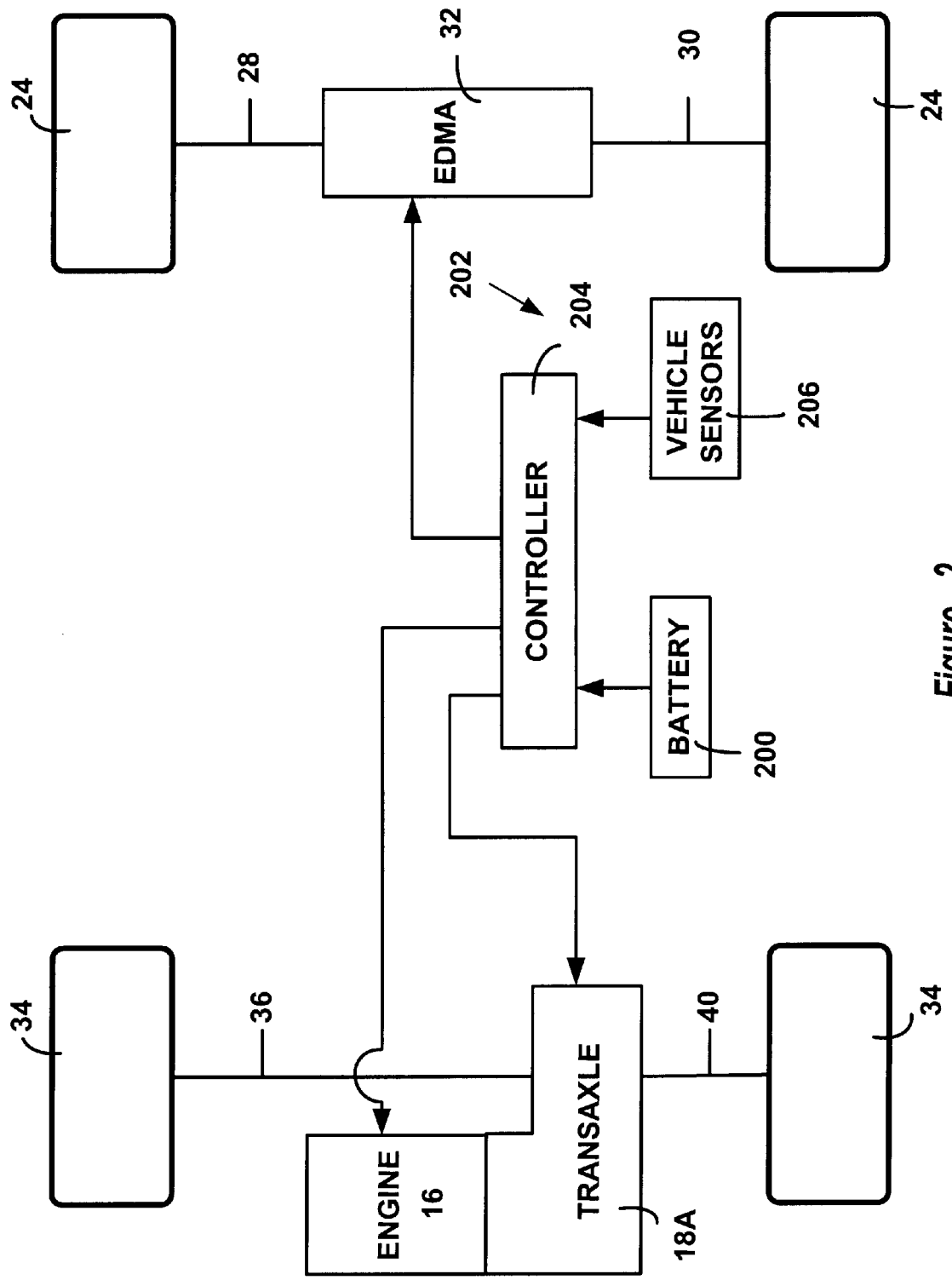
FIG. 2 is a schematic view of an alternative arrangement for the hybrid powertrain of the present invention.

In the particular layout shown in FIG. 1, first powered driveline 12 delivers power to rear wheels 24 while second powered driveline 14 delivers power to front wheels 34. Obviously, those skilled in the art would understand that the opposite powertrain arrangement can be utilized such that EDMA 32 supplies power to the rear wheels. To better illustrate this arrangment, FIG. 2 shows EDMA 32 supplying power to rear wheels 24 through axleshafts 28 and 30 while engine power is supplied to front wheels 34 through a transaxle 18A and axleshafts 36 and 40. Regardless of the particular arrangement, hybrid vehicle 10 includes two distinct powered drivelines capable of both independent and combined operation to drive the vehicle.

Figure 3:
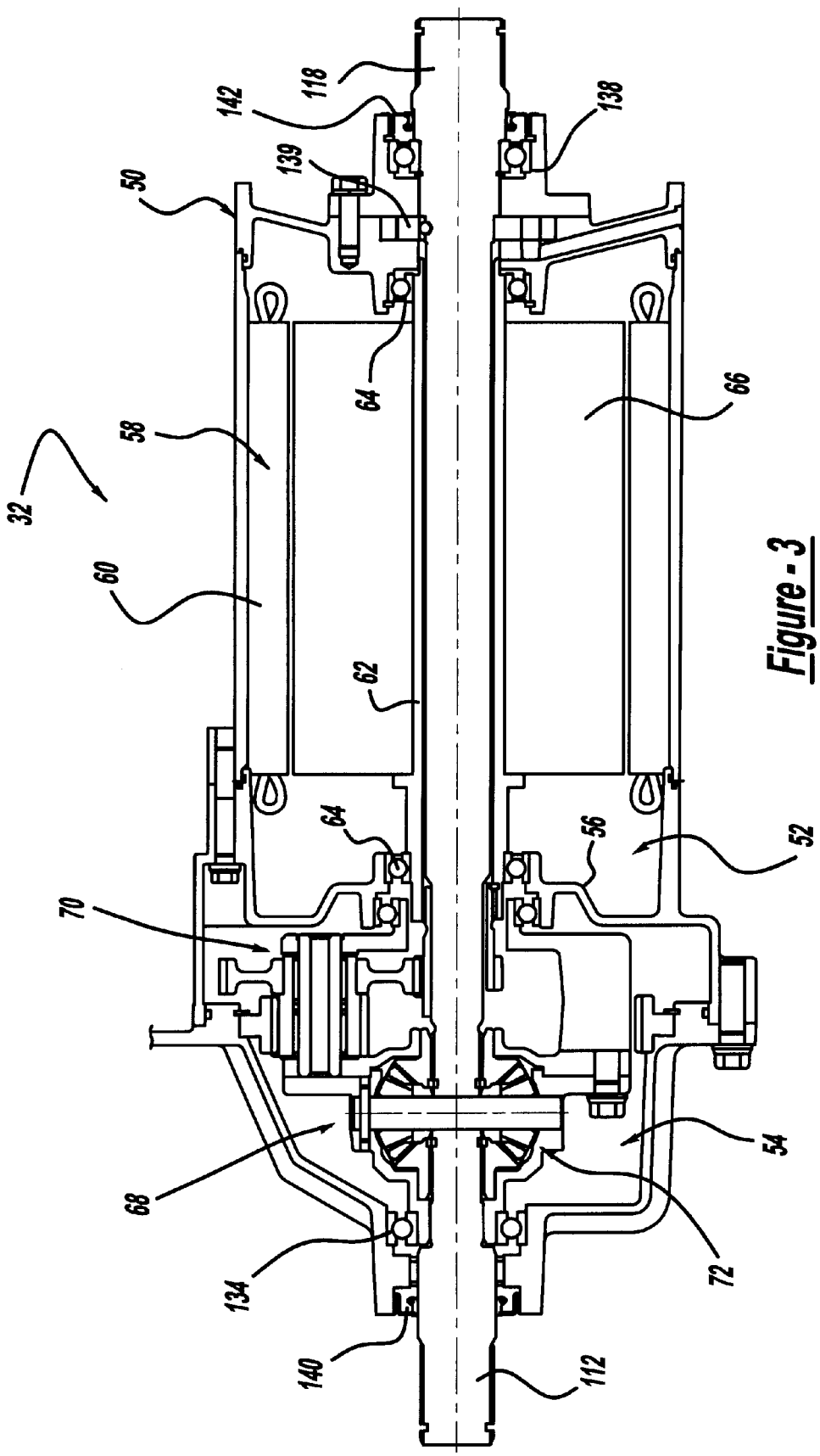
FIG. 3 is a sectional view of an electric drive motor axle associated with the hybrid powertrains of FIGS. 1 and 2.
Figure 4:
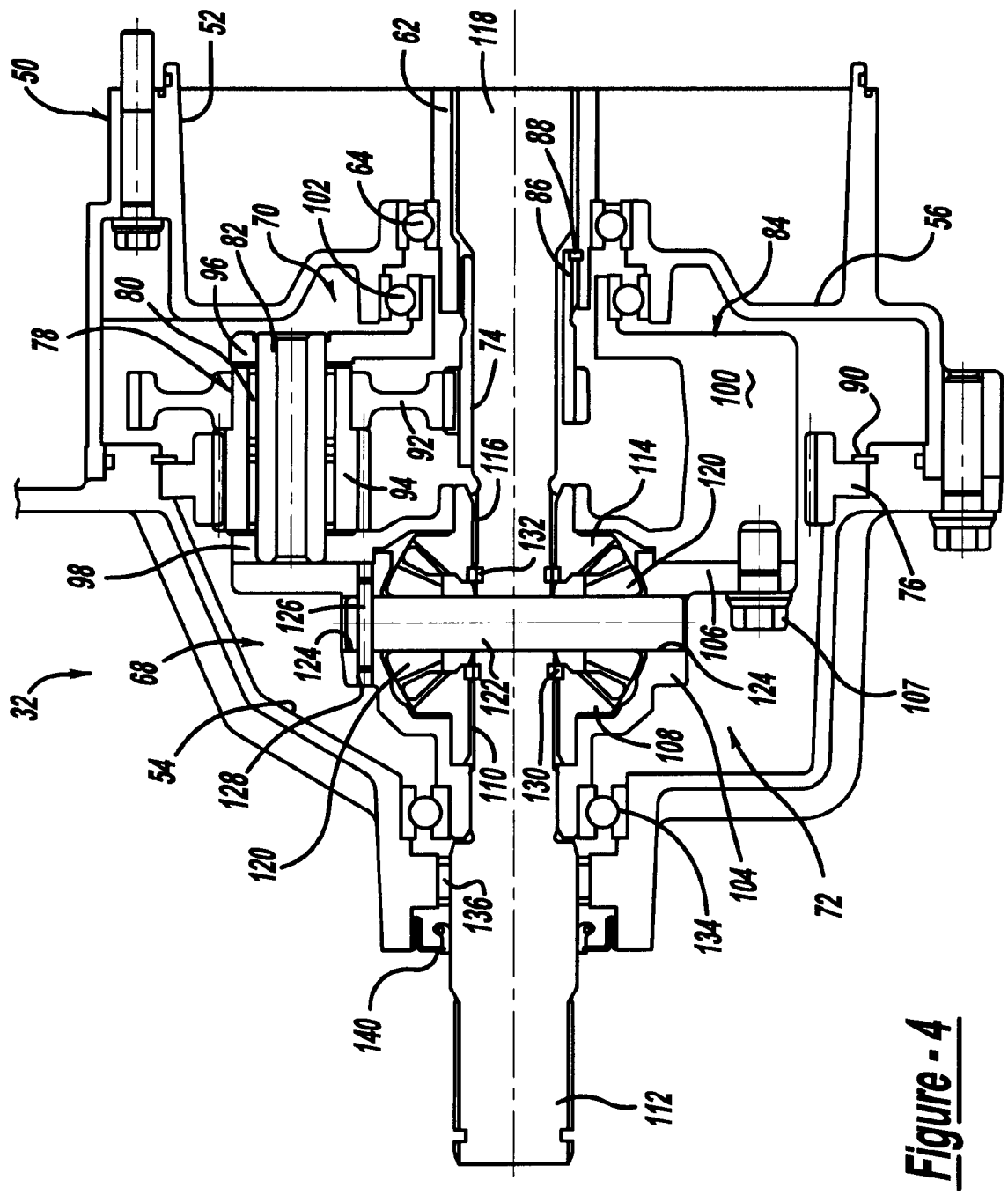
FIG. 4 is an enlarged portion of FIG. 3 showing the components associated with the gearbox of the electric drive motor axle in greater detail.

Referring now to FIGS. 3 and 4, a first preferred embodiment of EDMA 32 will be described in detail. EDMA 32 includes a multi-section housing assembly 50 defining a motor chamber 52 and a gearbox chamber 54 separated by a radial support wall 56. An electric variable speed motor assembly 58 is located within motor chamber 52 and includes a wound stator 60 secured to housing assembly 50 and an elongated tubular rotor shaft 62. Rotor shaft 62 is supported at its opposite ends by bearing assemblies 64 for rotation relative to housing assembly 50. Motor assembly 58 also includes a rotor assembly 66 fixed for rotation with rotor shaft 62.

EDMA 32 further includes a gearbox 68 located within gearbox chamber 54 and which is comprised of a planetary reduction unit 70 and a bevel differential 72. Planetary reduction unit 70 includes a sun gear 74, a ring gear 76, and a plurality of compound planet gears 78 rotatably supported by bearings 80 on pins 82 mounted to a planet carrier 84. Sun gear 74 can be integrally formed at one end of rotor shaft 62 (as shown in upper-half of FIG. 3) or, in the alternative, can be a tubular unit that is fixedly secured to rotor shaft 62 (as shown in lower-half of FIG. 3). As best seen from FIG. 4, sun gear 74 is fixed via a spline connection 86 for rotation with rotor shaft 62 while ring gear 76 is fixed to housing assembly 50. Snap rings 88 and 90 are provided to restrain axial movement of sun gear 74 and ring gear 76, respectively. Each compound planet gear 78 includes a first gear segment 92 that is meshed with sun gear 74 and a second gear segment 94 that is meshed with ring gear 76. First and second gear segments 92 and 94 can be integrally formed or, in the alternative, can be defined by separate gears which are rigidly fixed together (i.e., welded) for common rotation. Planet carrier 84 is shown to include a first ring section 96 and a second ring section 98 integrally connected at a plurality of circumferential locations by a lug section 100. First ring section 96 is shown to be supported for rotation by a bearing assembly 102.

With continued reference to FIG. 4, bevel differential 72 is shown to include a bell-shaped casing 104 having a radial ring segment 106 secured via bolts 107 to second ring section 98 of planet carrier 84. Bevel differential 72 further includes a first side gear 108 fixed via a spline connection 110 to a first output shaft 112, a second side gear 114 fixed via a splined connection 116 to a second output shaft 118, and at least one pair of pinions 120 meshed with side gears 108 and 114. Pinions 120 are rotatably supported on a pinion shaft 122 having its opposite ends located in polar apertures 124 formed in casing 104. A retainer pin 126 mounted in a transverse aperture 128 formed in casing 104 passes through pinion shaft 122 so as to non-rotatably mount pinion shaft 122 to casing 104. Casing 104 is also configured to define a circumferential bearing surface for supporting an axial extension of first side gear 108. Likewise, second ring section 98 of planet carrier 84 defines a circumferential bearing surface for supporting an axial extension of second side gear 114. In addition, snap rings 130 and 132 axially restrain side gears 108 and 114 relative to the respective output shafts 112 and 118. A bearing assembly 134 is shown to rotatably support casing 104 from housing assembly 50.

In accordance with a preferred use of EDMA 32, output shafts 112 and 118 are adapted to be connected to corresponding ones of front axleshafts 36 and 40 for the hybrid powertrain arrangement shown in FIG. 1 or, alternatively, to corresponding ones of rear axleshafts 28 and 30 for the powertrain arrangement shown in FIG. 2. In this manner, EDMA 32 functions as an electrically-powered secondary axle assembly which can be controlled independently, or in combination with, the engine-base powertrain. To provide a compact arrangement, second output shaft 118 is shown to extend through tubular rotor shaft 62. Bearings 136 and 138 support output shafts 112 and 118, respectively, for rotation relative to housing assembly 50. Additionally, resilient end seals 140 and 142 are provided. It is contemplated that a lube pump 139 could be provided to circulate lubricant with gearbox chamber 54. Lube pump 139 could be electric or shaft driven as required.

In operation, rotation of rotor shaft 62 via actuation of electric motor assembly 58 causes concurrent rotation of sun gear 74. Since ring gear 76 is held stationary, rotation of sun gear 74 causes compound planet gears 78 to rotate and drive planet carrier 84 at a reduced speed. Obviously, the speed reduction ratio is established by the specific geometries of the meshing gears, but is preferred to be in the range of 10.0:1 to 15.0:1 for such hybrid motor vehicle applications. Since planet carrier 84 acts as the driven output of planetary reduction unit 70, it drives casing 104 of bevel differential 72 at a common rotary speed. Power is then transferred through pinions 120 to side gears 108 and 114 and ultimately to output shafts 112 and 118. Variable speed control of motor assembly 58 permits the torque delivered to the wheels to be variably controlled.

Figure 5:
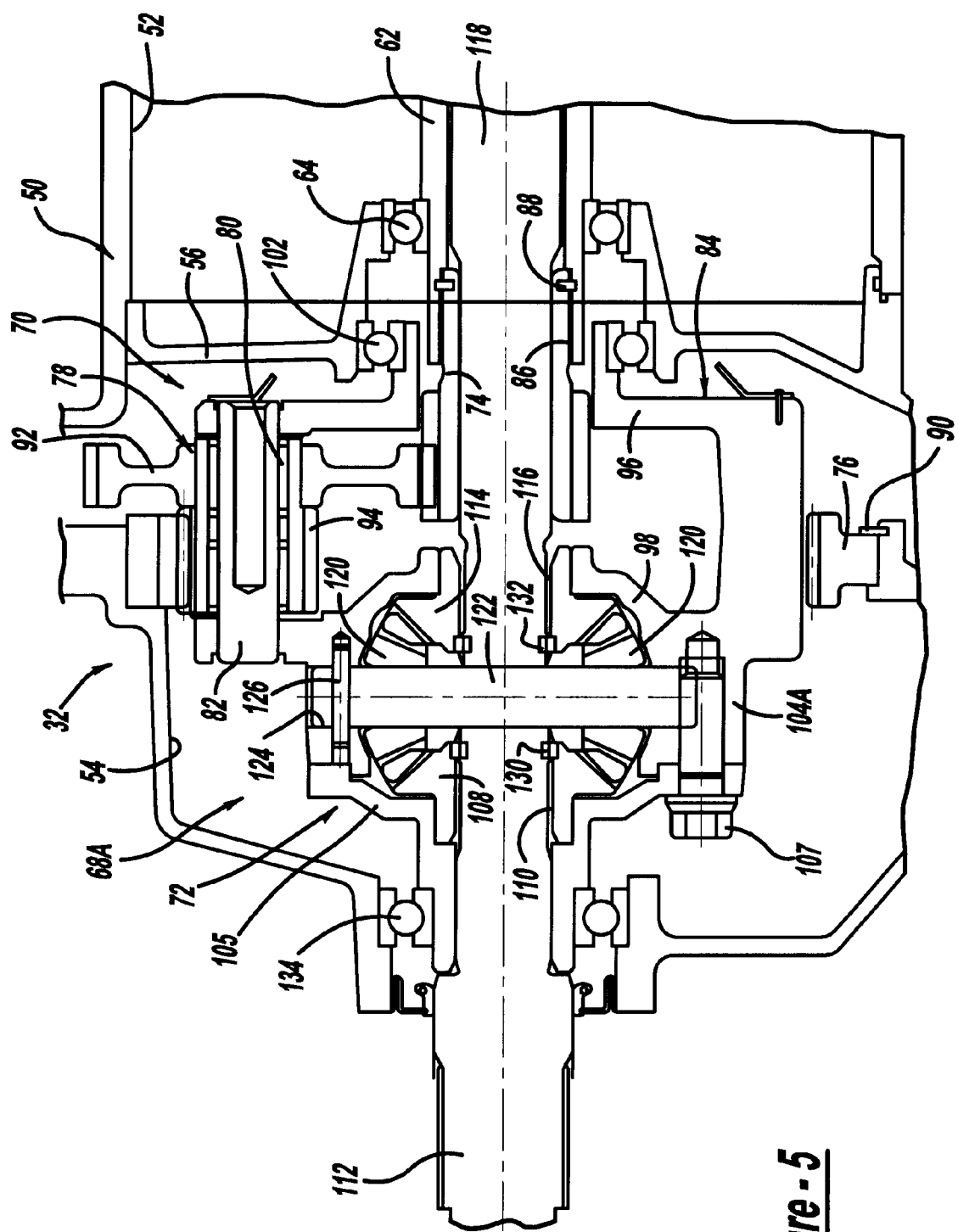
FIG. 5 is a sectional view of an alternative embodiment of the gearbox that is adapted for use in the electric drive motor axle of the present invention.

Referring now to FIG. 5, a slightly modified gearbox 68A is shown located within gearbox chamber 54 of housing assembly 50. Specifically, differential casing 104A is now shown to be integrally formed with second ring section 98 of planet carrier 84 and an end cap 105 is secured via bolts 107 to differential casing 104A. As such, first side gear 108 is now supported by a circumferential bearing surface provided by end cap 105 and bearing assembly 134 supports end cap 105 from housing assembly 50.

Figure 6:
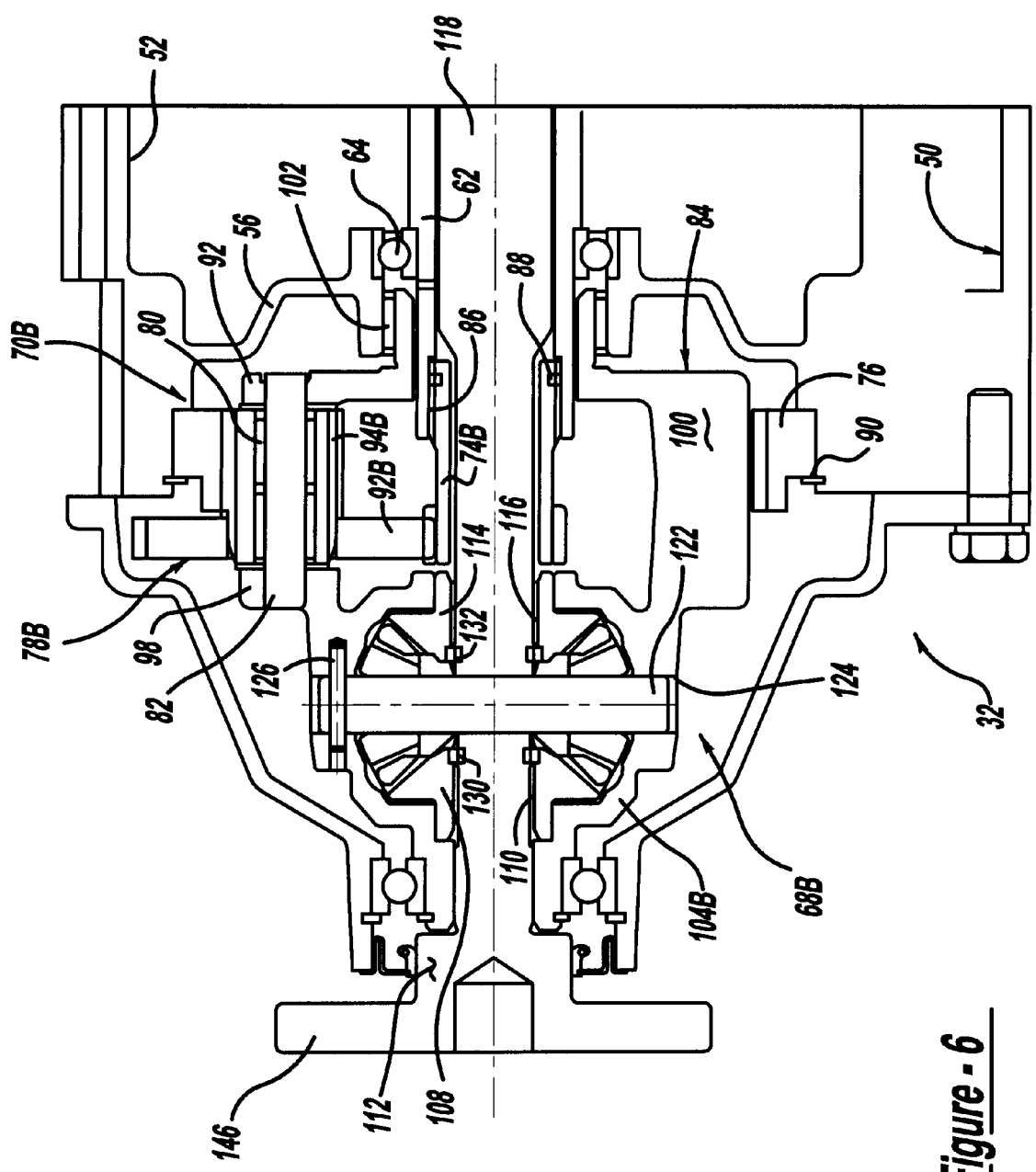
FIG. 6 is a sectional view of a further alternative embodiment of the gearbox for use in the electric drive motor axle of the present invention.

Referring to FIG. 6, another modified gearbox 98B is shown wherein planetary reduction unit 70B has the gear segments 92B and 94B of compound planet gears 78B reversed relative to that shown in FIGS. 4 and 5. This arrangement requires use of a slightly longer sun gear 74B. In addition, differential casing 104B is shown to be integrally formed with planet carrier 84 so as to eliminate bolts 107. Assembly windows (not shown) would be formed in differential casing 104B to permit assembly of pinions 120 and side gears 108 and 114 therein. A yoke 146 is shown integrally formed at one end of first output shaft 112 in place of the slip yoke splines shown in FIGS. 3 through 5.

Figure 7:
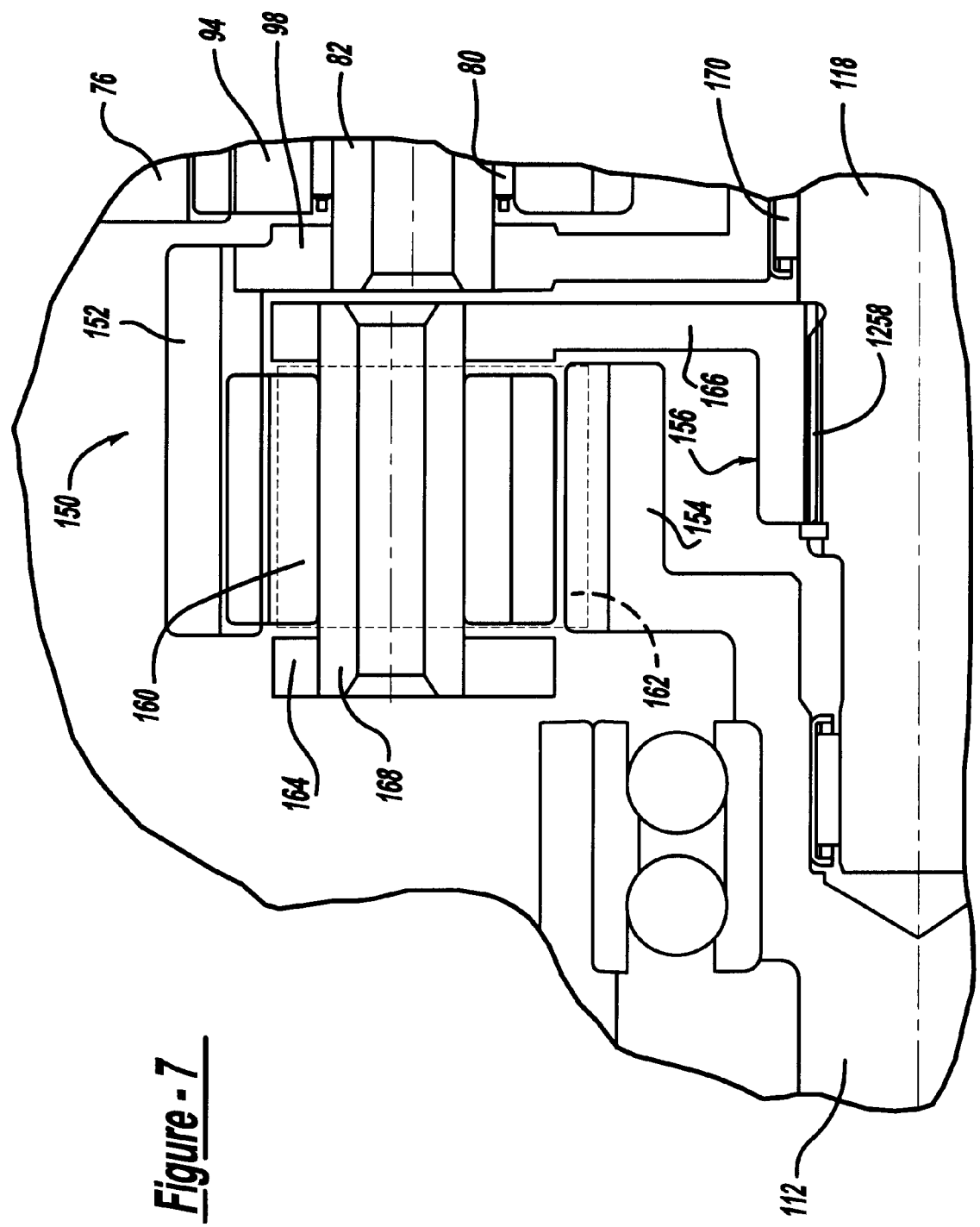
FIG. 7 is a partial sectional view of a planetary-type differential adapted for use with the gearboxes shown in FIGS. 4 through 6.

Referring now to FIG. 7, an alternative type of differential unit 150 is shown which can be substituted for the bevel-type differential previously described. In particular, differential unit 150 is a planetary gearset having an annulus gear 152 driven by second ring segment 98 of planet carrier 84, an output sun gear 154 fixed to first output shaft 112, and an output carrier 156 fixed via a splined connection 158 to second output shaft 118. Differential unit 150 also includes a set of first pinions 160 that are meshed with annulus gear 152 and a set of second pinions 162 (shown in phantom) that are meshed with output sun gear 154 and first pinions 160. Output carrier 156 includes an outer ring segment 164 connected to an inner ring segment 166 between which pinions 160 and 162 are rotatably supported. Specifically, pins 168 support first pinions 160 while similar pins (not shown) rotatably support second pinions 162. First pinions 160 and second pinions 162 are circumferentially arranged in a plurality of meshed pairs to transfer drive torque and facilitate speed differentiation between output carrier 156 and output sun gear 154. A bearing 170 is shown supporting second ring segment 98 of planet carrier 84 from second output shaft 118. Thus, differential unit 150 exemplifies a planetary-type gearset that can be used in place of bevel-type gearsets, it being understood that other arrangements known for use as a vehicular differential could also be used.

As noted, the hybrid powertrain system of the present invention includes two drive power sources, namely engine 16 and motor assembly 58 of EDMA 32. Power from engine 16 is transmitted to transmission 18 (or transaxle 18A) which can be of any known type (i.e., automatic, manual, automated manual, CVT, etc.) having a forward-reverse mechanism and a gearshift mechanism. Motor assembly 58 of EDMA 32 is connected to a battery 200 and can be selectively shifted into any of a DRIVE state, a CHARGING state, and a NO-LOAD state by an electronic control system 202. In the DRIVE state, EDMA 32 functions as a motor-driven gearbox that is driven by electrical energy drawn from battery 200. In the CHARGING state, EDMA 32 functions as an electric generator for storing electric energy in battery 200. In the NO-LOAD state, motor assembly 58 is off and rotor shaft 62 is permitted to rotate freely relative to stator 60.

Figure 8:
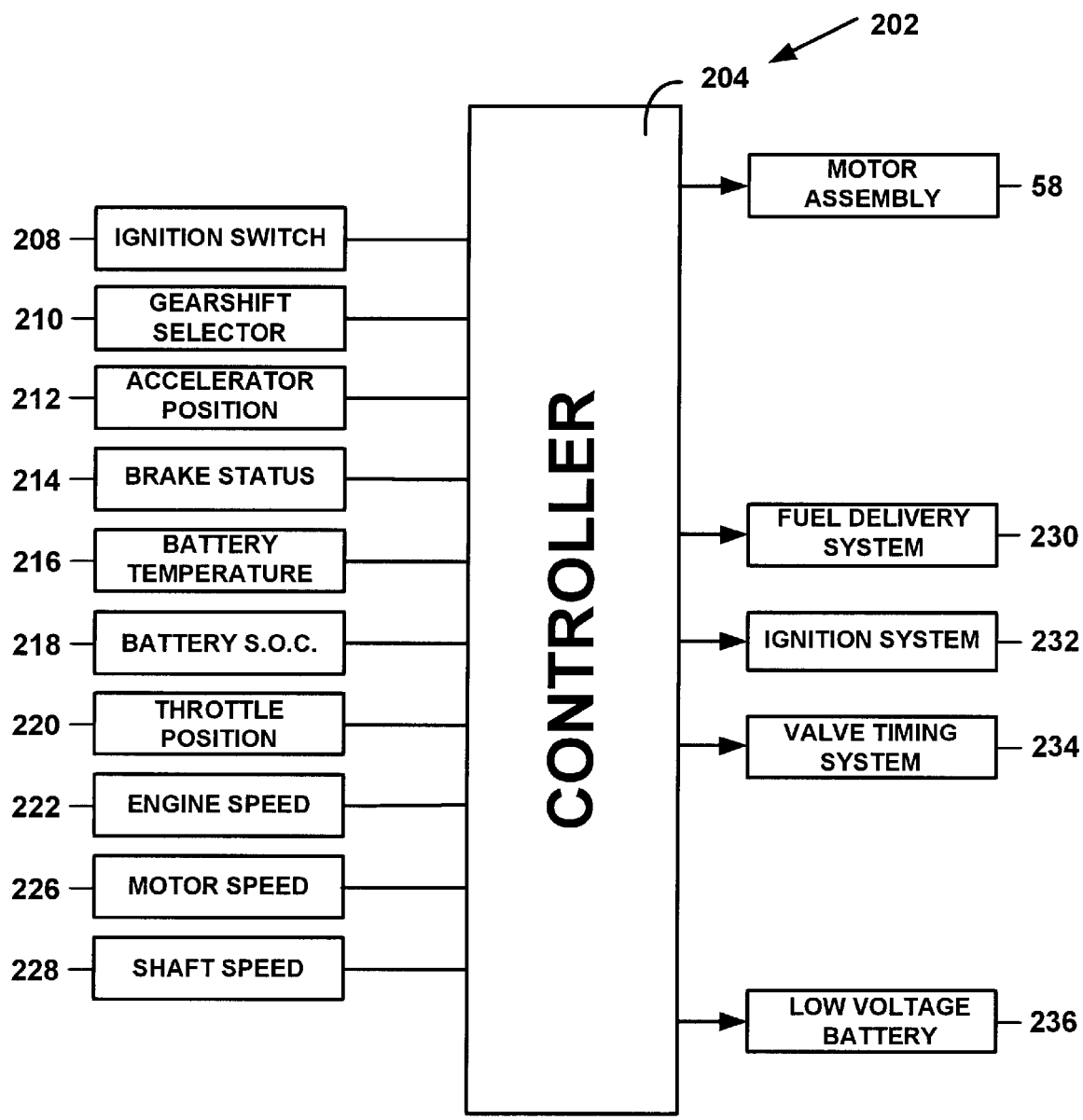
FIG. 8 is a schematic diagram of an exemplary control system associated with the hybrid powertrains of the present invention.

Control system 202 is provided for controlling operation of the hybrid powertrains shown in FIGS. 1 and 2. Referring to FIG. 8, control system 202 includes a controller 204 adapted to receive input signals from various sensors and input devices cumulatively identified in FIGS. 1 and 2 as vehicle sensors 206. Controller 204 is schematically shown in block format to be representative of an arrangement having an engine control section, a motor control sections, and a traction control section. Controller 204 is principally comprised of a microcomputer having a central processing unit (CPU), random-access memory (RAM), read-only memory (ROM), and an input-output actuator interface. Controller 204 performs data processing operations to execute various control routines according to control programs and/or maps stored in the ROM. Controller 204 receives data from an ignition switch 208, a gearshift lever switch 210, an accelerator position sensor 212, a brake status switch 214, a battery temperature sensor 216, a battery SOC (state of charge) sensor 218, and a throttle position sensor 220. In addition, other inputs include an engine speed sensor 222, a motor speed sensor 226, and a driveshaft speed sensor 228. Ignition switch 208 is closed when the vehicle key is turned on. Assuming transmission 18 is of an automatic type, then "P", "N", "R", and "D" switches in gearshift selector switch 210 are closed when the gearshift mechanism is located in its Park (P), Neutral (N), Reverse (R) and Drive (D) positions, respectively. Accelerator position sensor 212 senses the depression angle of an accelerator pedal. Brake status switch 214 is turned on when the brake pedal is depressed. Battery temperature sensor 216 senses the temperature of battery 200. Battery SOC sensor 218 senses the charge level of battery 200. Throttle position sensor 220 senses the degree of opening of the engine throttle valve. Engine speed sensor 222 senses a parameter indicative of the rotary speed of the drive shaft of engine 16. Motor speed sensor 226 senses a parameter indicative of the rotary speed of rotor 62 of motor assembly 58. Shaft speed sensor 228 senses the rotary speed of propshaft 20 and can further be used as an indication of vehicle speed.

Based on the operating information inputted to controller 204, a mode of operation of the hybrid powertrain is selected and controller 204 sends electric control signals to various power-operated control devices. Specifically, controller 204 monitors and continuously controls actuation of motor assembly 58 of EDMA 32 and various engine management systems for controlling the speed and torque generated by engine 16. These engine management systems include a fuel delivery system 230, an ignition system 232, and a valve timing system 234. A low voltage battery 236 may serve as the power supply for controller 204.

There are four modes of operation for vehicle 10, namely: (a) an electric mode; (b) a hybrid; (c) an engine mode; and (d) a regenerative mode. In the electric mode, only motor assembly 58 provides motive power to vehicle 10. In the hybrid mode, both engine 16 and motor assembly 58 provide motive power to vehicle 10. In the engine mode, only engine 16 provides motive power to vehicle 10. In the regenerative mode, a portion of the engine power is absorbed by motor assembly 58 to charge battery 200. The transition from one mode to the next is smooth and transparent to the vehicle operator since controller 204 selects the most appropriate mode depending on various vehicle operating conditions including vehicle speed, accelerator demand and battery charge status.

In the electric mode, motor assembly 58 is shifted into its DRIVE state such that motive power is generated by EDMA 32. When shifting from the electric mode into the hybrid mode, engine 16 is started and provides motive power in conjunction with EDMA 32 to establish four-wheel drive operation. When the vehicle's operating conditions warrant operation in the engine only mode, motor assembly 58 is shifted into one of its CHARGING or NO-LOAD states. Thus, a four-wheel drive mode of operation is established when both powered drivelines are actuated and controlled. The traction control section of controller 204 is operable to control slip conditions between the front and rear wheels.

Preferred embodiments of the invention has been disclosed to provide those skilled in the art an understanding of the best mode currently contemplated for the operation and construction of the hybrid drive systems. The invention being thus described, it will be obvious that various modifications can be made without departing from the true spirit and scope of the invention, and all such modifications as would be considered by those skilled in the art are intended to be included within the scope of the following claims.

What is claimed is:

1. A drive axle for a motor vehicle, comprising:

a housing defining first and second chambers;

an electric motor disposed in said first chamber and having a rotor shaft extending into said second chamber; and a gearbox disposed in said second chamber and operably coupling said rotor shaft to first and second output shafts, said gearbox including a planetary reduction gearset having a ring gear fixed to said housing, a sun gear driven by said rotor shaft, a planet carrier, and compound planet gears rotatably supported by said planet carrier and having a first gear segment meshed with said sun gear and a second gear segment meshed with said ring gear, said gearbox further including a differential assembly having an input member driven by said planet carrier, a first output member driving said first output shaft, and a second output member driving said second output shaft.

2. The drive axle of claim 1 wherein said rotor shaft is tubular and is rotatably supported on said second output shaft.

3. The drive axle of claim 1 wherein said differential assembly is a bevel gearset having a differential casing fixed for rotation with said planet carrier, a first side gear fixed for rotation with said first output shaft, a second side gear fixed for rotation with said second output shaft, and pinions rotatably supported by said casing and meshed with said first and second side gears.

4. The drive axle of claim 3 wherein said planet carrier includes a first ring offset from and interconnected to a second ring with said compound planet gears rotatably supported on pins extending between said first and second rings.

5. The drive axle of claim 4 wherein said differential casing includes a radial plate segment fixedly secured to said second ring of said planet carrier.

6. The drive axle of claim 4 wherein said second ring of said planet carrier is integral with said differential case.

7. The drive axle of claim 1 wherein said differential assembly is a planetary gearset having a second ring gear fixed for rotation with said planet carrier, an output sun gear fixed for rotation with said first output shaft, an output carrier fixed for rotation with said second output shaft, a first pinion rotatably supported by said output carrier and meshed with said second ring gear, and a second pinion rotatably supported by said output carrier and meshed with said first pinion and said output sun gear.

8. The drive axle of claim 1 wherein said first and second output shafts are adapted for connection to a pair of first wheels to deliver drive torque thereto in response to actuation of said electric motor.

9. The drive axle of claim 8 wherein said first wheels are front wheels of the motor vehicle.

10. The drive axle of claim 9 wherein the motor vehicle has rear wheels driven by power from an engine.

11. The drive axle of claim 8 wherein said first wheels are rear wheels of the motor vehicle.

12. The drive axle of claim 11 wherein the motor vehicle has front wheels driven by power from an engine.

13. An electrically-powered drive axle for driving a pair of wheels in a motor vehicle, comprising:

a housing;

first and second output shafts rotatably supported by said housing and adapted for connection to the pair of wheels;

an electric motor assembly disposed in said housing and having a rotor shaft; and a gearbox disposed in said housing and including a planetary reduction gearset and a bevel differential, said planetary reduction gearset having a sun gear driven by said rotor shaft, a ring gear non-rotatably secured to said housing, a planet carrier, and a plurality of compound planet gears rotatably supported by said planet carrier and having a first gear segment meshed with said sun gear and a second gear segment meshed with said ring gear, said bevel differential having a casing driven by said planet carrier, a first side gear fixed for rotation with said first output shaft, a second side gear fixed for rotation with said second output shaft, and pinions rotatably supported by said casing and meshed with said first and second side gears.

14. The drive axle of claim 13 wherein said rotor shaft is tubular and is rotatably supported on said second output shaft.

15. The drive axle of claim 13 wherein said planet carrier includes a first ring offset from and interconnected to a second ring with said compound planet gears rotatably supported on pins extending between said first and second rings.

16. The drive axle of claim 15 wherein said differential casing includes a radial plate segment fixedly secured to said second ring of said planet carrier.

17. The drive axle of claim 15 wherein said second ring of said planet carrier is integral with said differential case.

18. The drive axle of claim 13 further comprising:

vehicle sensors for detecting operating characteristics of the motor vehicle and generating sensor signals; and a controller for generating electrical control signals in response to said sensor signals, said control signals being delivered to said motor assembly for controlling the rotary speed of said rotor shaft.

19. An electrically-powered drive axle for driving a pair of wheels in a motor vehicle, comprising:

a housing;

first and second output shafts rotatably supported by said housing and adapted for connection to the pair of wheels;

an electric motor assembly disposed in said housing and having a rotor shaft; and a gearbox disposed in said housing and having a first sun gear driven by said rotor shaft, a first ring gear fixed to said housing, a first carrier, and compound planet gears rotatably supported by said first carrier and having a first gear segment meshed with said first sun gear and a second segment meshed with said first ring gear, said gearbox also including a second ring gear driven by said first carrier, a second sun gear fixed for rotation with said first output shaft, a second carrier fixed for rotation with said second output shaft, a set of first pinions rotatably supported by said second carrier and meshed with said second ring gear, and a set of second pinions rotatably supported by said second carrier and meshed with said second sun gear and said first pinions.

20. The drive axle of claim 19 wherein said rotor shaft is tubular and is rotatably supported on said second output shaft.

21. The drive axle of claim 19 further comprising:

vehicle sensors for detecting operating characteristics of the motor vehicle and generating sensor signals; and a controller for generating electrical control signals in response to said sensor signals, said control signals being delivered to said motor assembly for controlling the rotary speed of said rotor shaft.

22. A hybrid motor vehicle, comprising:

a first powered driveline including an engine operable for driving a first pair of wheels; and a second powered driveline including a drive axle operable for driving a second pair of wheels, said drive axle including a housing, an electric motor located in said housing and having a rotor shaft, and a gearbox located in said housing and having a reduction gearset and a differential, said reduction gearset having a sun gear driven by said rotor shaft, a ring gear fixed to said housing, a planet carrier, and compound planet gears supported by said planet carrier and having a first gear segment meshed with said sun gear and a second gear segment meshed with said ring gear, said differential having an input member driven by said planet carrier and first and second output members driving said second pair of wheels.

23. The hybrid motor vehicle of claim 22 wherein said drive axle further includes a first output shaft coupled to said first output member and a second output shaft coupled to said second output member, and wherein said rotor shaft is tubular and rotatably supported on said second output shaft.

24. The hybrid motor vehicle of claim 23 wherein said differential is a bevel gearset having a casing fixed for rotation with said planet carrier, a first side gear fixed for rotation with said first output shaft, a second side gear fixed for rotation with said second output shaft, and pinions rotatably supported by said casing and meshed with said first and second side gears.

25. The hybrid motor vehicle of claim 23 wherein said differential is a planetary gearset having a second ring gear fixed for rotation with said planet carrier, an output sun gear fixed for rotation with said first output shaft, an output carrier fixed for rotation with said second output shaft, a first pinion rotatably supported by said output carrier and meshed with said second ring gear, and a second pinion supported by said output carrier and meshed with said first pinion and said output sun gear.

26. The hybrid motor vehicle of claim 22 further comprising:

vehicle sensors for detecting operating characteristics of the motor vehicle and generating sensor signals; and a controller for generating electrical control signals in response to said sensor signals, said control signals being delivered to said motor assembly for controlling the rotary speed of said rotor shaft.

\* \* \* \* \*